United States Patent [19]

Shibuya

[11] Patent Number: 5,337,369
[45] Date of Patent: Aug. 9, 1994

[54] EQUIPMENT FOR FINGERPRINT PATTERN CLASSIFICATION

[75] Inventor: Tatsuo Shibuya, Tokyo, Japan

[73] Assignee: NEC Corporation, Tokyo, Japan

[21] Appl. No.: 118,209

[22] Filed: Sep. 9, 1993

[30] Foreign Application Priority Data

Sep. 9, 1992 [JP] Japan .................................. 4-240241

[51] Int. Cl.$^5$ ............................................. G06K 9/00
[52] U.S. Cl. ............................................. 382/5; 382/4
[58] Field of Search .......................... 382/4, 5; 356/71;
G06K 9/00, 9/74

[56] References Cited

U.S. PATENT DOCUMENTS

| | | | |
|---|---|---|---|
| 4,947,442 | 8/1990 | Tanaka et al. | 382/5 |
| 5,040,224 | 8/1991 | Hara | 382/5 |
| 5,105,467 | 4/1992 | Kim et al. | 382/5 |
| 5,140,642 | 8/1992 | Hsu et al. | 382/5 |
| 5,177,792 | 1/1993 | Morita | 382/5 |

FOREIGN PATENT DOCUMENTS 4-52974  2/1992  Japan .

OTHER PUBLICATIONS

Fumio Noda et al., "Automated Fingerprint Classifier", Waseda University, pp. 21–29, Mar. 1974.
Kenta Goto et al., "Fingerprint Classification by Distribution Pattern of Ridge Directions", Kogakuin University, pp. 23–29, 1988.

*Primary Examiner*—Yon J. Couso
*Attorney, Agent, or Firm*—Sughrue, Mion, Zinn, Macpeak & Seas

[57] ABSTRACT

In fingerprint pattern classification, use of delta data is avoided, since there is a large probability of a fingerprint missing delta data. Ridge line shape around a core of a ridge direction pattern and ridge direction trend in a predetermined window are used for the classification.

7 Claims, 9 Drawing Sheets

| No. | 1 | 2 | 3 | 4 | 5 |
|---|---|---|---|---|---|
| PATTERN NAME | $G_{11}$ | $G_{12}$ | $G_{13}$ | $G_{14}$ | $G_{15}$ |
| RIDGE LINE SHAPE | $G_{21}$ | $G_{22}$ | $G_{23}$ | $G_{24}$ | ✕ |
| RIDGE DIRECTION TREND | ✕ | $G_{32}$ | $G_{33}$ | $G_{34}$ | $G_{35}$ |

$G_{11}$: WHORL $G_{12}$: RIGHT LOOP

$G_{13}$: LEFT LOOP $G_{14}$: TENTED ARCH

$G_{15}$: PLAIN ARCH

EQUIPMENT FOR FINGERPRINT PATTERN CLASSIFICATION

BACKGROUND OF THE INVENTION

This invention relates to an equipment for automatically classifying a picked fingerprint pattern.

Fingerprint identification can be used for identifying individuals, for example, in an access control system. And in order to minimize the identification time, fingerprints are classified into several patterns.

Generally, a ridge direction pattern is used for fingerprint classification. A fingerprint image picture is subdivided into a matrix of equally shaped rectangles called zones. In each zone, an average direction of ridge lines is estimated and the estimated average direction is quantized to determine a direction label of the zone. A matrix of direction labels of the zones represents the ridge direction pattern of the fingerprint image picture.

Gotoh et al. proposed a method of matching to reference ridge direction patterns prepared beforehand, on "Fingerprint Image Classification by Ridge Direction Distribution." in IE81-88, Technical Report of Japanese Electrical Communication vol. 18, no. 210. On "Fingerprint Pattern Classifier" in Treatise of Japanese Electronics and Electrical Communication, Noda et al. proposed a method of pattern classification in accordance with delta data, that is, existence, numbers, and position coordinates of deltas. Here a delta means a triangle formed by a combination of ridge direction Labels. Noda et al. considered a matrix of ridge direction labels as a vector field, and from a line integration of the rotation of the field and an areal integration of the divergence of the field, determined feature points including the center of a fingerprint called core, and the deltas.

In these aforementioned methods, the delta has been an important factor for fingerprint pattern classification. However, it is sometimes difficult to pick up deltas owing to their positions in the fingerprint. Especially, in a fingerprint pattern recognizer used for criminal investigation where lost fingerprints are to be classified, delta missing fingerprints are frequently treated and the use of the delta data has usually been difficult.

And in a method of fingerprint pattern classification where no feature point is employed, there has been a problem of misjudgment owing to noises produced from flaws and wrinkles in a fingerprint image picture.

SUMMARY OF THE INVENTION

Therefore, an object of the present invention is to provide a fingerprint pattern classifier in which no delta data is employed.

Another object of this invention is to provide a fingerprint pattern classifier which is immune from the effect of the noise on a fingerprint image picture.

In order to achieve these objects, the ridge line shape and the ridge direction trend around the core of a fingerprint ridge direction pattern are classified under predetermined rules, and the fingerprint pattern to which the ridge direction pattern belongs, is decided in accordance with the ridge line shape and the ridge direction trend of the ridge direction pattern.

Thus, in an embodiment of this invention, an equipment for fingerprint pattern classification comprises; means for obtaining a fingerprint image picture and producing a two-dimensional picture data from the image picture, means for subdividing the two-dimensional picture data into grid-shaped plural zones, means for determining ridge direction in each zone to produce a ridge direction pattern of the fingerprint picture, means for detecting the core of the fingerprint picture from the ridge direction pattern, means for determining ridge direction trend from the core and the ridge direction pattern in an window fixed by a predetermined rule, means for determining ridge line shape around the core from the ridge direction pattern utilizing the distribution and the position relation of the ridge direction labels, means for classifying fingerprint patterns to one of predetermined several patterns according to the ridge line shape and the ridge direction trend, and means for rejecting classification of a fingerprint pattern which does not belong to any one of the predetermined several patterns.

BRIEF DESCRIPTION OF THE DRAWINGS

Further objects, features, and advantages of this invention will become apparent from a consideration of the following description, the appended claims, and the accompanying drawings in which the same numerals indicate the same or the corresponding parts.

DETAILED DESCRIPTION OF THE PREFERRED EMBODIMENTS

Figure 1:
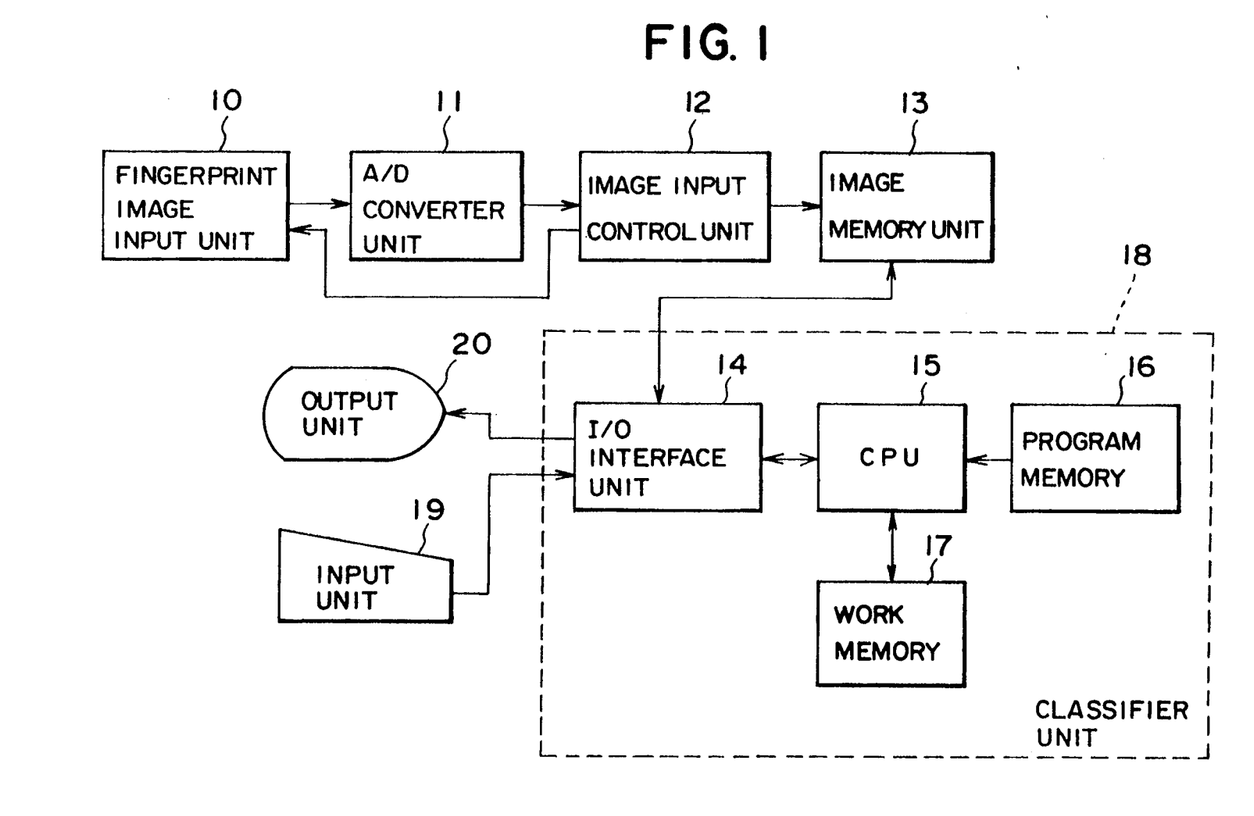
FIG. 1 shows a block diagram illustrating a system construction of an embodiment of this invention.

Referring to FIG. 1, a fingerprint image input unit 10 comprises a photo-electric transducer for producing an electrical signal of fingerprint pictures taken, for example, from a surface of a finger placed on a transparent plate, from a fingerprint picture printed on a sheet, or from a fingerprint lost in a criminal site. The electrical signal output from the fingerprint image input unit 10 is converted to digital signals by an A/D converter 11, to be stored in an image memory unit 13 through an image input control unit 12. A set of digital signals from the A/D converter unit 12 is stored in the image memory unit 13 in a two-dimensional area, and each digital signal representing a point of a fingerprint picture is stored at an address of the memory unit 13 corresponding to the coordinates position of the point in the fingerprint picture.

A classifier unit 18 classifies the fingerprint pattern stored in the image memory unit 13. An input unit 20 is used for entering necessary information to the classifier 18, and an output unit 20 is used for displaying necessary information from the classifier unit 18.

An I/O interface 14 serves as an interface between the classifier unit 18 and the I/O units 13, 19 and 20. A CPU 15 has a program memory 16 and a work memory 17. Data from the image memory unit 13 is processed by a program controlled CPU 15 in the classifier unit 18.

Examples of the fingerprint image input unit 10 are disclosed in laid-open publications No. 69300/'79 and No. 85600/'79 of Japanese patent applications, where ITV( Industrial Television) is used for a face of a finger laid on a transparent plate. Another laid open publication No. 138174/'80 of a Japanese patent application discloses an example of fingerprint image input unit 10 adapted to be used for a fingerprint picture printed on a sheet.

Figure 2:
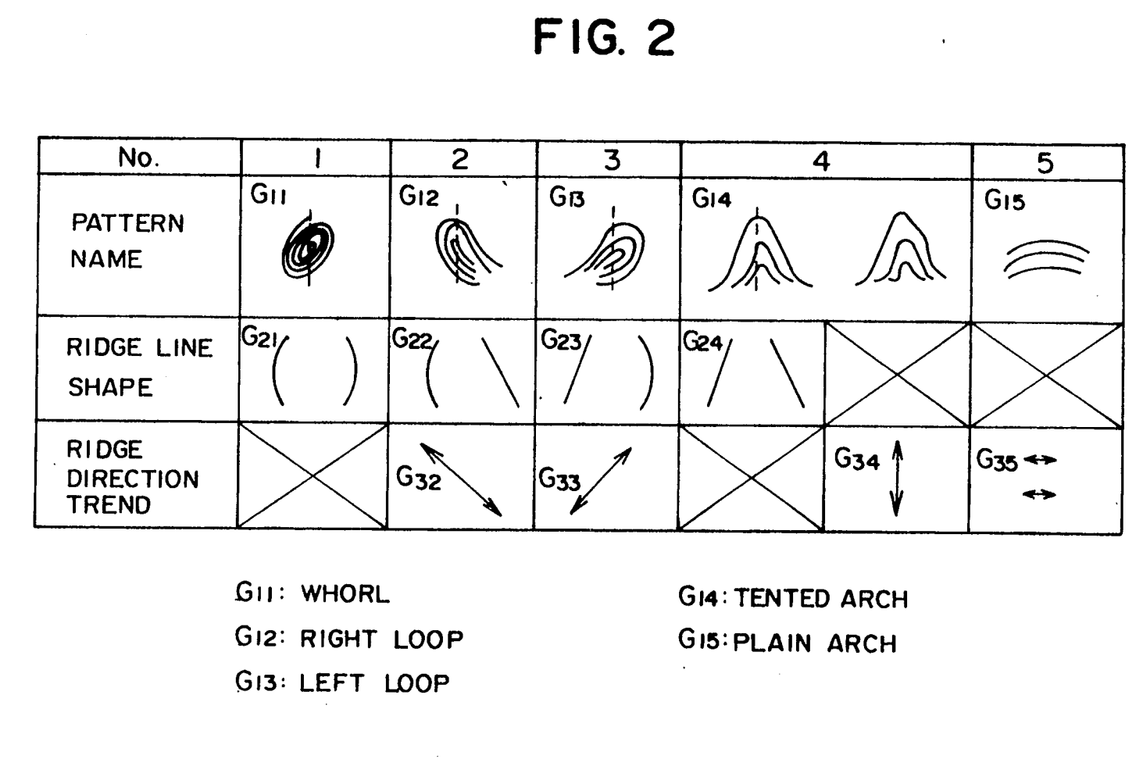
FIG. 2 shows a fingerprint pattern classification used in this invention.

Now referring to FIG. 2, classified fingerprint patterns are shown. In this invention, fingerprint patterns are divided into five different groups as indicated in the first row of FIG. 2 by Nos. 1–5, and in the second row by pattern name $G_{11}$, $G_{12}$, $G_{13}$, $G_{14}$, and $G_{15}$, where $G_{11}$ denotes a whorl, $G_{12}$ denotes a right loop, $G_{13}$ denotes a left loop, $G_{14}$ denotes a tented arch, and $G_{15}$ denotes a plain arch. Dotted lines in the second row indicate a column including the core.

These classifications from No. 1 to No. 5 are determined in accordance with the ridge line shape denoted by $G_{21}$, $G_{22}$, $G_{23}$, and $G_{24}$, in the third row and riddle direction trend denoted by $G_{32}$, $G_{33}$, $G_{34}$ and $G_{35}$ in the fourth row.

Figure 3:
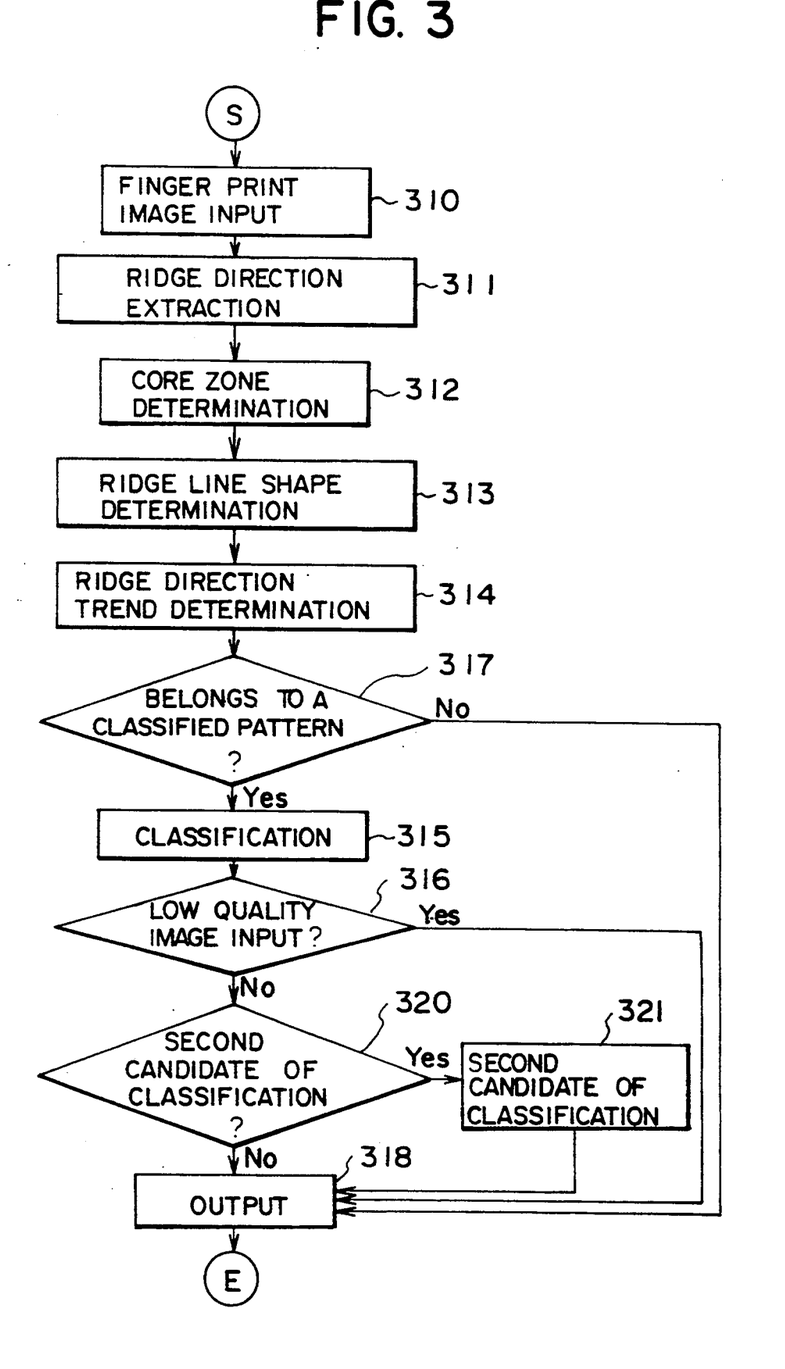
FIG. 3 shows a flow diagram of an embodiment of this invention.

In the flow diagram of FIG. 3, program steps from 310 to 318 and program steps 320, 321 are executed by the CPU 15. In step 310, the fingerprint image data is input to the classifier unit 18 from the image memory unit 13 through the I/O interface 14. In step 311, the ridge direction pattern is produced, and in step 312, core zone is determined.

Figure 4:
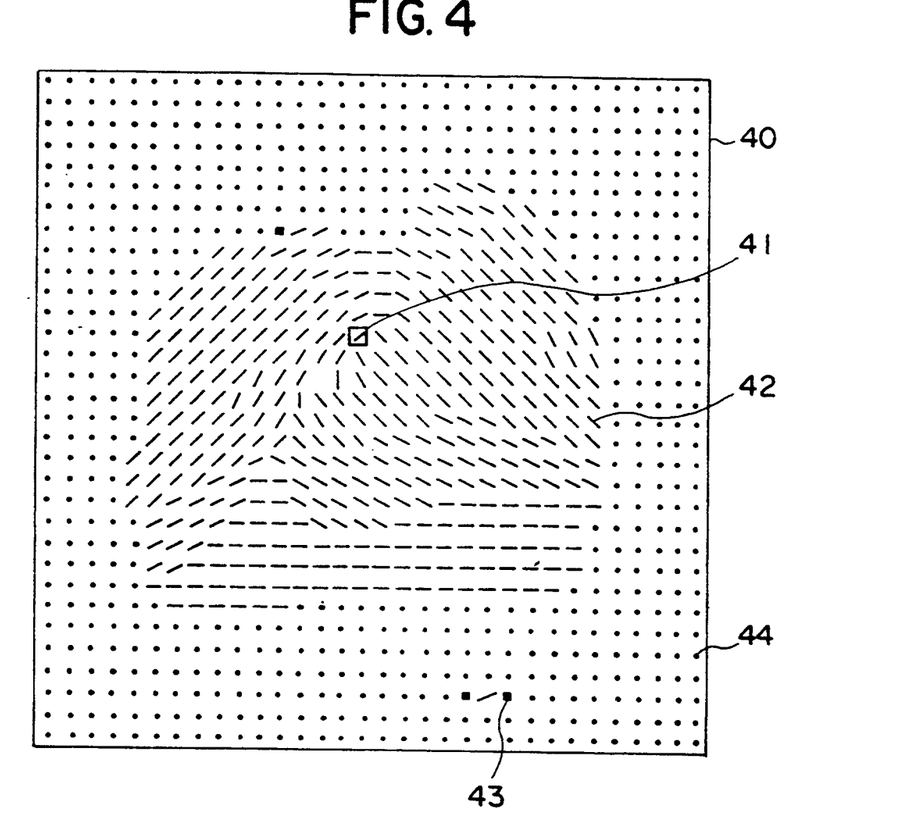
FIG. 4 shows an example of a ridge direction pattern determined from a fingerprint picture data.

Referring to FIG. 4, there are shown a ridge direction pattern of a fingerprint. A two-dimensional fingerprint image data in the image memory unit 13 is subdivided into grid shaped zones. For example, in an embodiment shown by FIG. 4 there are 32×32 zones in a zone data 40. In each zone, an average value of ridge directions is calculated, and this average value is quantized in eight levels differing by $\pi/8$ unit as denoted by from 0 to 7 in FIG. 5. These quantized ridge directions are called labels of the ridge directions. The zone data 40 including labels of all the zones is called a ridge direction pattern. The quantization of ridge directions may be in 16 or in 32 directions.

Figure 5:
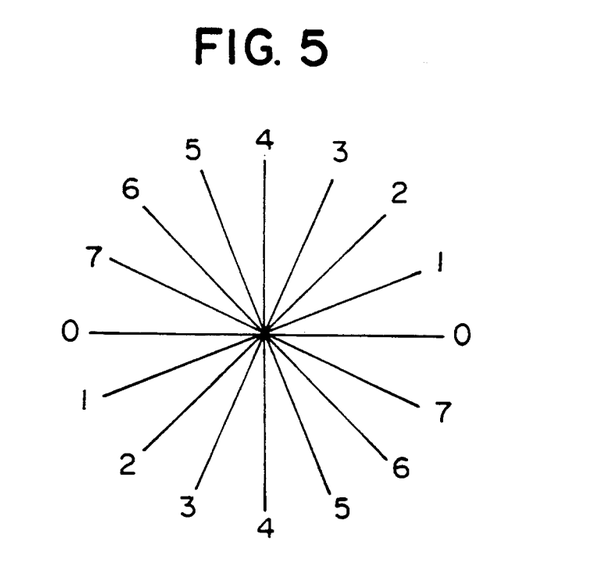
FIG. 5 shows an example of ridge direction labels.

Directions labeled by 1, 2, 3 are called right-hand side ascending directions and directions labeled by, 5, 6, 7 are called left-hand side ascending directions, while label 0 means a horizontal direction and label 4 means a vertical direction.

In FIG. 4, zones in which the ridge direction label is determined is represented by a short line in the label direction as indicated by numeral 42. A zone where at least a ridge line is included but the ridge direction label is undeterminable, is denoted by a black square 43, and a zone where no ridge line is found is denoted by a black circle 44. A core zone 41 including the core of the ridge direction pattern is determined by step 312.

Methods used in steps 311 and 312 have been disclosed, for example, in laid open publications No. 138174/'80, No. 271883/'89 and No. 271885/'80 of Japanese patent applications.

The process in step 313 is explained in connection with FIG. 6, in which the ridge line shape around the core zone 41 is determined. In step 313, the zone data 40 is scanned, and in this scanning y direction is determined as a direction which is perpendicular to the direction of a joint of the finger for which the fingerprint is obtained, and x direction is determined as a direction perpendicular to the y direction.

For the following descriptions, position coordinates in a zone data 40 is determined in which a unit of x or y is a zone in x or y direction. The origin of the coordinate axes is at the core zone 41, and x increases from left to right and y increases from top to bottom.

Figure 6:
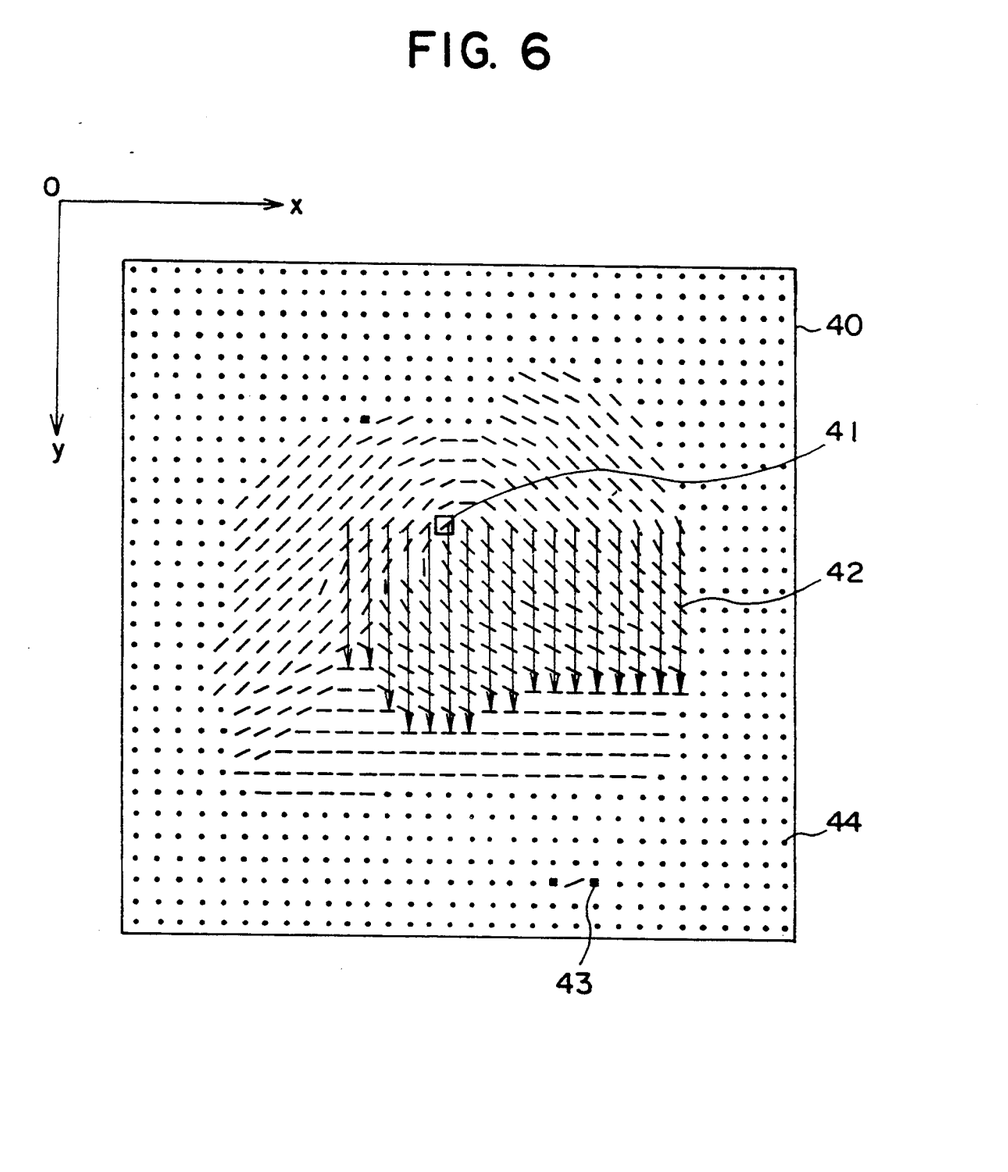
FIG. 6 illustrates means for determining ridge line shape in this invention.

In the scanning as shown by arrows in FIG. 6, the primary scanning is in y direction starting from y=0 and in an increasing direction, and the secondary scanning is in x direction starting from x=0 and scanning in both directions for decreasing and increasing x. Only labeled zones 42 are taken into consideration. The primary scanning is terminated when a zone labeled by 0 is scanned, and the secondary scanning is extended for all values of x in the zone data 40.

In this scanning shown in FIG. 6, flexion of ridge direction in a y direction is to be detected. Here, the flexion of ridge direction is defined as a change of ridge direction from a right-hand side ascending direction to a left-hand side ascending direction in −x zones, and a change of ridge direction from a left-hand side ascending direction to a right-hand side ascending direction in +x zones. Here, a change of ridge direction from vertical to horizontal is deemed as a change from a right-hand side ascending to a left-hand side ascending, in −x zones, and a change ridge direction from vertical to horizontal is deemed as a change from a left-hand side ascending to a right-hand side ascending in +x zones.

When a flexion of ridge direction is not detected in zones within a predetermined x distance from the core 41, it is assumed that there is no flexion in that side of the core 41. If a flexion detected outside this predetermined range, the detection is considered as an error due to noise.

In the example shown by FIG. 6, flection of ridge direction is detected in zones left-hand from the core 41, and is not detected in zones right-hand from the core 41. This type of ridge line shape belongs to the ridge line shape shown as group $G_{22}$ of FIG. 2.

Figure 7:
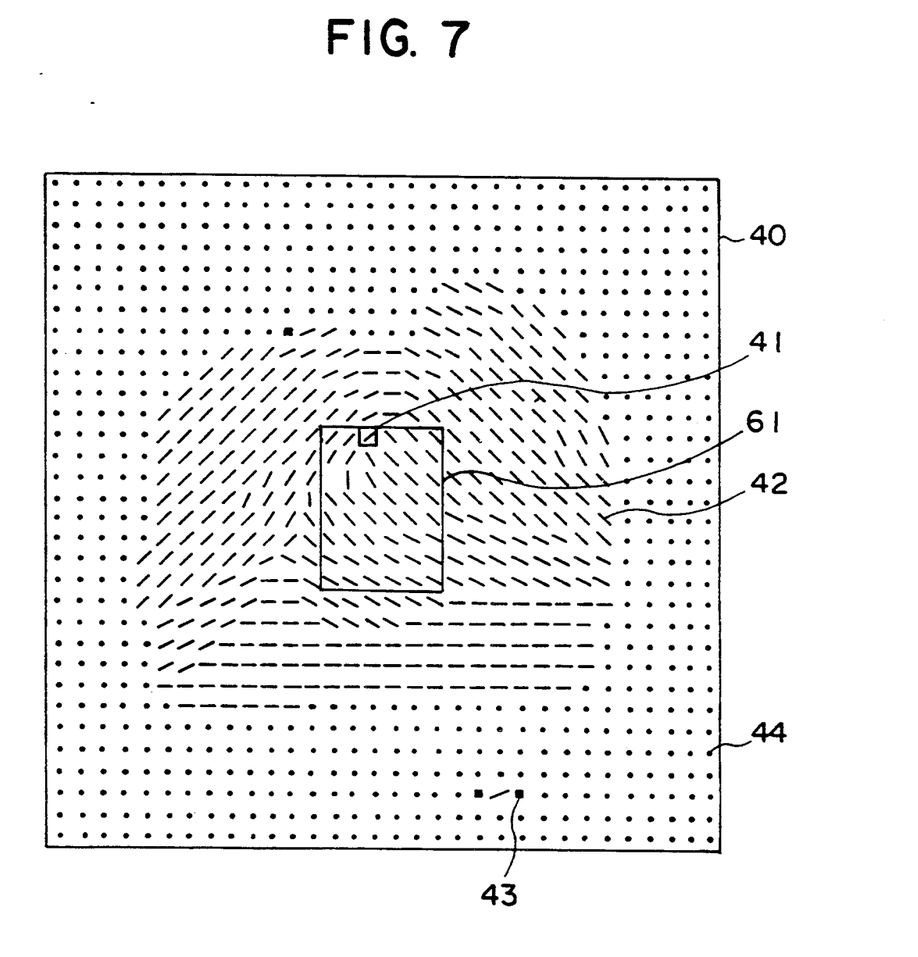
FIG. 7 illustrates means for determining ridge direction trend in this invention.
Figure 8:
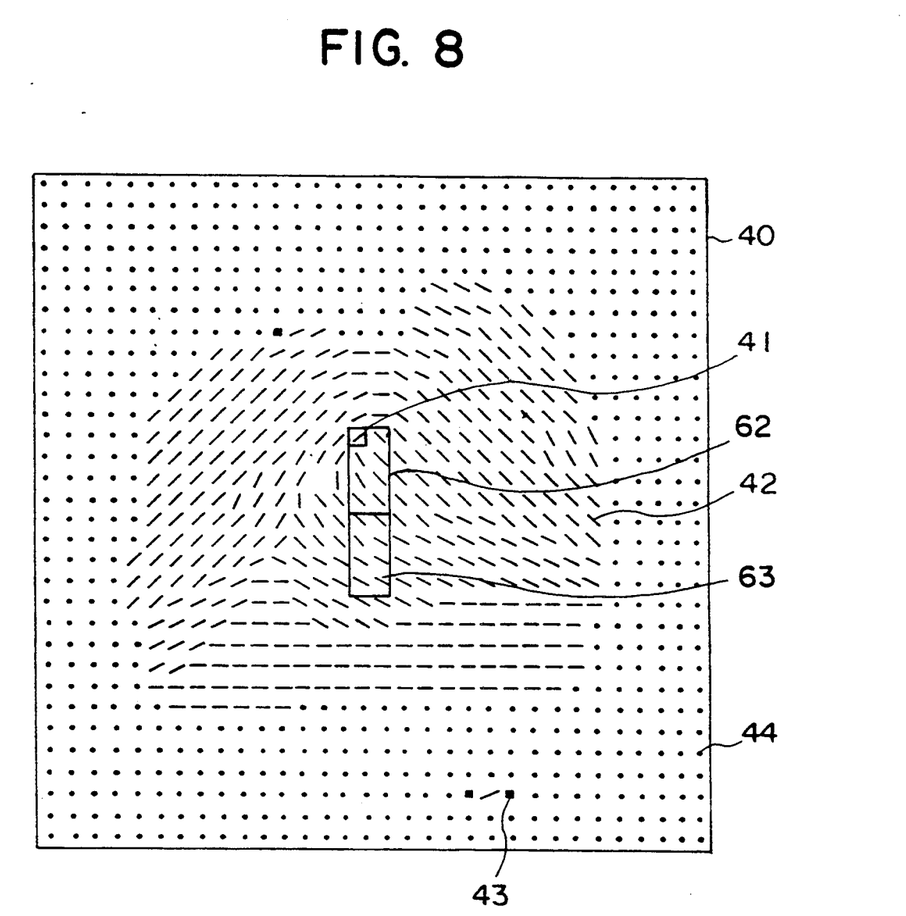
FIG. 8 illustrates means for determining ridge direction trend in this invention.

In step 314, ridge direction trend is detected. Referring to FIG. 7 and FIG. 8, scanning areas for detecting ridge direction trend are shown. The upper limit of the window 61 of FIG. 7 is y=0, the left limit is x=2, and the right limit is x=3. The lower limit is determined in accordance with the value of H calculated by equation (1) in x direction scanning $$H=[a(0)+0.5\{a(1)+a(7)\}+0.05\{a(2)+a(6)\}]/A \qquad (1),$$

where $$A=a(0)+a(4)+0.5\{a(1)+a(3)+a(5)+a(7)\}+0.1\}a(2)+a(6) \qquad (2)$$

and a(n) denotes a total number of zones having label n. When $H>S_1$ where $S_1$ is a predetermined value, the value of y of that line is determined as the lower limit. However, when the lower limit thus determined is on an odd value of y, one more y line is added in the window 61. The lower limit of the window 61 is denoted by $y_{max}$.

The upper limit of a window 62 of FIG. 8 is y=0, and the lower limit is $y=y_{max}/2$, which is the upper limit of a window 63 of FIG. 8. The lower limit of the window 63 is $y=y_{max}$. The left limit of the windows 62, 63 is $x=0$, and the right limit of the windows 62, 62 is $x=1$.

In step 314, the ridge direction trend determination in the windows 62 and 63 is performed in advance. When there are only zones having labels 0, 1, or 7 in the windows 62 and 63, the ridge direction trend of the zone data 40 is detected as horizontal($G_{35}$ in FIG. 2). When the ridge direction trend is not horizontal, the trend of the zone data 40 is determined in the window 61 of FIG. 7.

When the window 61 is determined, the value of T is calculated by equation(3) for the whole zones in the window 61, $$T=[a(2)+0.5\{a(1)+a(3)\}+0.05\{a(0)+a(4)\}]/B, \quad (3)$$

where $$B=a(2)+a(6)+0.5\{a(1)+a(3)+a(5)+a(7)\}+0.1\{a(0)+a(4)\}] \quad (4)$$

In accordance with the value of T, the trend of the ridge direction around the core zone is classified into either one of the three groups as indicated by $G_{32}$(left-hand side ascending), $G_{33}$(right-hand side ascending), and $G_{34}$(vertical) in FIG. 2.

In an example shown by FIGS. 6-8, the ridge line shape has a flection in $-x$ area, and no flection in $+x$ area and belongs to group $G_{22}$ in FIG. 2, and the ridge direction trend belongs to group $G_{32}$. This ridge direction pattern is classified into a right loop($G_{12}$).

In general, in step 317, the ridge line shape determined in step 313 and the ridge direction trend determined in step 314 are used to classify a zone data 40 into one of the classes denoted by $G_{11}$–$G_{15}$ in FIG. 2. When the combination of the ridge line shape and the ridge direction trend obtained from a zone data 40 does not match to any one of the pattern names shown in FIG. 2, the zone data is designated as REJECT, and the program step goes to step 318.

For zone data 40 which are not rejected in step 317, are classified in step 315 in a following way. A ridge direction pattern having flection on both sides($G_{21}$) is classified as a whorl, a ridge direction pattern having horizontal ridge direction trend($G_{32}$) is classified as a plain arch, a ridge direction pattern having no flection($G_{24}$) or a vertical ridge direction trend($G_{34}$) is classified as a tented arch.

A ridge direction pattern having flection only in $-x$ zones($G_{22}$) and with a left-hand side ascending ridge direction trend($G_{32}$) is classified as a right loop, while a ridge direction pattern having flection only in $+x$ zones($G_{23}$) and with a right-hand side ascending ridge direction trend($G_{33}$) is classified as a left loop.

Figure 10:
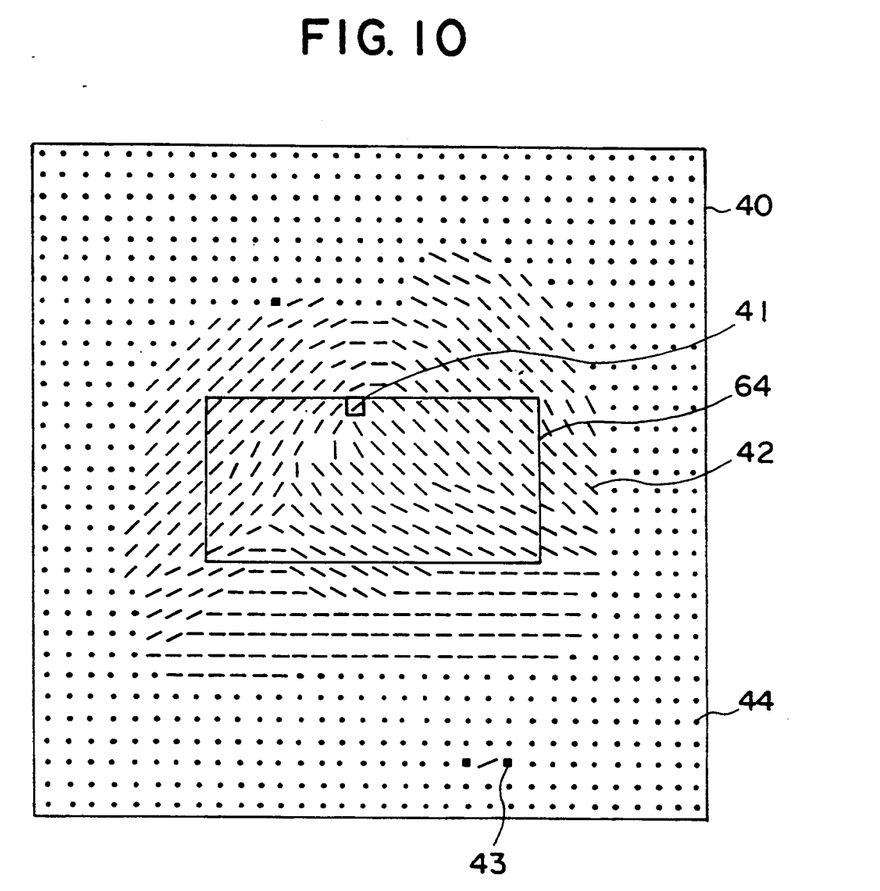
FIG. 10 illustrates means for determining classification rejection in this invention.

The reliability of the classification is examined in step 316. Referring to FIG. 10, a window 64 is determined in a following way. The upper limit is $y=0$ and the lower limit is $y=y_{max}$. The right and left limit are determined by value V calculated from equation(5), $$V=[a(4)+0.5\{a(3)+a(5)\}+0.05\{a(2)+a(6)\}]/A \quad (5)$$

The first y line where $V>S_2$ is determined as the left limit(in $-x$ zones) or the right limit(in $+x$ zones).

Total number of undeterminable zones 43 in the window 64 is a measure of degraded quality and total number of non data zones 44 in the window 64 is a measure of unreliability. When the total number of undeterminable zones 43 exceeds a predetermined limit or the total number of non data zones 44 exceeds another predetermined limit, the zone data 40 is designated as REJECT and the program step goes to step 318.

Figure 9:
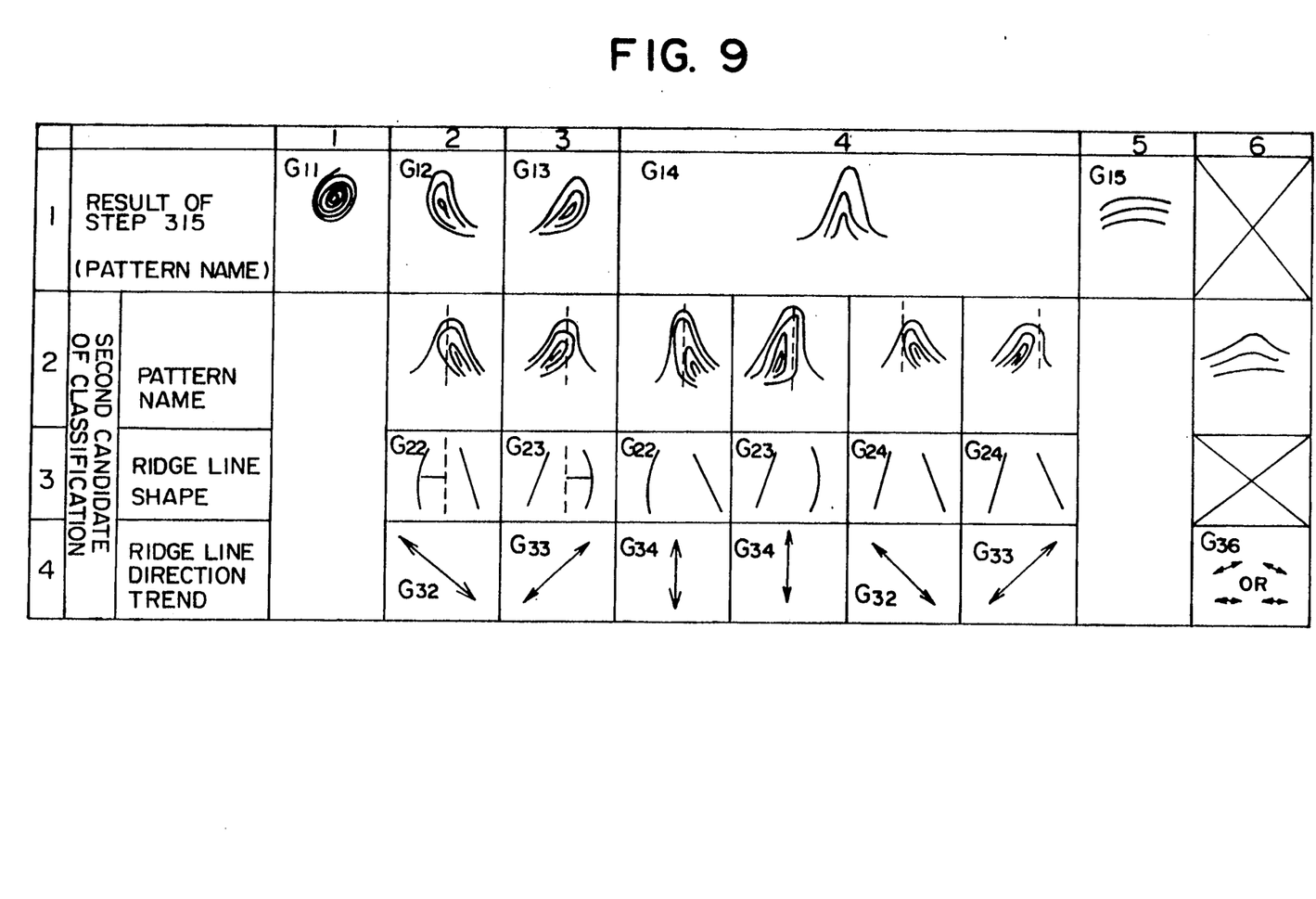
FIG. 9 shows second candidates of the classification in this invention.

In step 320, a second candidate of classification for a zone data 40 is investigated in accordance with following rules as illustrated in FIG. 9.

(r1) when the ridge direction trend is vertical($G_{34}$), first candidate is a tented arch($G_{14}$), but the second candidate is the right loop or the loop flow in accordance with the ridge line shape.

(r2) when the ridge line shape is $G_{24}$ in FIG. 2, the first candidate is tented arch. But the second candidate is the right loop or the left loop in accordance with the left-hand side ascending the right-hand side ascending ridge direction trend.

(r3) when the flection occurs in a y line very near to the core zone 41 in patterns $G_{12}$ or $G_{13}$ in FIG. 2, the second candidate of classification is a tented arch.

(r4) when the ridge direction trend in window 62 is not horizontal but nearly horizontal($G_{36}$) in FIG. 9, the second candidate is the plain arch. Here, the nearly horizontal ridge direction trend means that only labels 0, 1, 2, 7 or 0, 1, 6, 7 are included.

In step 321, a second candidate is determined, and the first candidate of classification determined in step 315 is displayed on the outpost unit 20 through the I/O interface 14 together with the second candidate determined in step 321.

When step 318 is entered from step 316 or 317, REJECT is displayed.

Although only preferred embodiments have been described on this invention, it must be understood that various modifications can be made without departing from the spirit of this invention.

What is claimed is:

1. An apparatus for fingerprint pattern classification, comprising:

means for converting a fingerprint image picture to a set of digital data and storing said set of digital data in an image memory unit such that each digital data corresponding to a point in said fingerprint image picture is stored at an address of said image memory unit corresponding to position coordinates of said point in the fingerprint image picture;

means for subdividing said set of digital data stored in said image memory unit into plural zones, estimating an average ridge direction in each zone, and quantizing said averaged ridge direction in each zone to produce a ridge direction pattern of a fingerprint image picture;

means for determining a core zone which satisfies a predetermined condition in said ridge direction pattern;

means for determining ridge line shape around the core zone of said ridge direction pattern;

means for determining ridge direction trend around the core zone of said ridge direction pattern;

means for classifying a ridge direction pattern in accordance with said ridge line shape and said ridge direction trend of said ridge direction pattern; and means for rejecting classification of a ridge direction pattern which does not match to any one of predetermined types of classification; and wherein said means for rejecting classification comprises means for estimating reliability of said ridge direction pattern and rejecting classification of a fingerprint pattern which does not produce a reliable ridge direction pattern, a position of a zone in said ridge direction pattern is defined in x-y rectangular coordinates in which y direction is determined to be perpendicular to a joint of a finger from which said fingerprint image picture is obtained, and x increases from left to right by a unit for a zone while y increases from top to bottom by a unit for a zone, said means for determining ridge line shape comprises means for detecting flection in y direction scanning for $(-x, +y)$ zones and for $(+x, +y)$ zones, said flection being defined as a change of ridge direction from a right-hand side ascending to a left-hand side ascending direction in $-x$ zones and as a change from a left-hand side ascending to a right-hand side ascending direction in $+x$ zones, said means for determining ridge direction trend comprises means for classifying ridge direction trend of zones in a predetermined window into a horizontal, a vertical, a right-hand side ascending, and a left-hand side ascending direction trend, and said means for classifying a ridge direction pattern comprises means for classifying a ridge direction pattern having the flection on both $-x$ and $+x$ zones to a pattern named whorl, a ridge direction pattern having the flection only in $-x$ zones with a left-hand side ascending ridge direction trend to a pattern named right loop, a ridge direction pattern having the flection only in $+x$ zones with a right-hand side ascending ridge direction trend to a pattern named left loop, a ridge direction pattern having no flection or having a vertical ridge direction trend to a pattern named tented arch, and a ridge direction pattern having a horizontal ridge direction trend to a pattern named plain arch.

2. An apparatus for fingerprint pattern classification according to claim 1, wherein said direction pattern has eight levels of quantized directions representing a direction from 0 to $7\pi/8$ by $\pi/8$, and labeled 0, 1, 2, ... 7;

said means for determining ridge line shape further comprises:

y direction scanning means for scanning zone labels from y=0 in an increasing y direction to a zone with label 0; and means for repeating said y direction scanning for all values of x and investigating whether there is a flection of ridge direction or not in a y direction, where said flection is defined as a change from a right-hand side ascending direction to a left-hand side ascending direction in $-x$ zones, and is defined as a change from a left-hand side ascending direction to a right-hand side ascending direction in $+x$ zones;

said means for determining ridge direction trend further comprises:

means for determining $y_{max}$ in $+x$ direction scanning by value H where $H=[a(0)+0.5\{a(1)+a(7)\}+0.05\{a(2)+0.05\{a(2)+a(6)\}]/A$ in which a(n) denotes a total number of zones having label n in a line of scanning and $A=a(0)+a(4)+0.5\{a(1)+a(3)+a(5)+a(7)\}+0.1\{a(2)+a(6)\}$ and $y_{max}$ is determined as a smallest even number of y where H becomes larger than a predetermined value;

means for defining a first window by two y lines at $x=-2$ and $x-3$ and by two x lines at $y=0$ and $y=y_{max}$, a second window by y lines at $x=0$ and $x=1$ and by x lines at $y=0$ and $y=y_{max}/2$, a third window by y lines at $x=0$ and $x=1$ and by x lines at $y=y_{max}/2$ and $y=y_{max}$;

means for scanning all labels in said second and third windows and attributing a horizontal ridge direction trend when only labels 0, 1, and 7 are found, and attributing a nearly horizontal ridge direction trend when only labels 0, 1, 2, 6 and 7 are found in said second and third windows; and means for determining ridge direction trend by scanning all labels in said first window on a ridge direction pattern from calculated value of T where $T=[a(2)+0.5\{a(1)+a(3)\}+0.05\{a(0)+a(4)\}]/B$ in which $B=a(2)+a(6)+0.5\{a(1)+a(3)+a(5)+a(7)\}+0.1\{a(0)+a(4)\}$, and attributing a vertical, a right-hand side ascending, or a left-hand side descending ridge direction trend in accordance with the calculated value T; and said means for classifying a ridge direction pattern further comprises:

means for classifying a ridge direction pattern with a ridge line shape having inflection in both sides of said core zone to a pattern named whorl, means for classifying a ridge direction pattern with a ridge line shape having inflection only in the left-hand side of said core zone and with a left-hand side ascending ridge direction trend to a pattern named right loop;

means for classifying a ridge direction pattern with a ridge line shape having inflection only in the right-hand side of said core zone and with a right-hand side ascending ridge direction trend to a pattern named left loop;

means for classifying a ridge direction pattern without flection or a ridge direction pattern with a vertical ridge direction trend to a pattern named tented arch; and means for classifying a ridge direction pattern with a horizontal ridge direction trend to a pattern named plain arch.

3. An apparatus for fingerprint pattern classification according to claim 2, further comprising means for determining a second candidate of classification comprising:

means for determining the pattern named trend arch as the second candidate when flection is detected in a vicinity of x=0 line in a right loop or in a left loop;

means for determining the pattern named right loop or left loop as the second candidate when flection is detected in $-x$ zones or in $+x$ zones in a tented arch;

means for determining the pattern named right loop or left loop as the second candidate when there is no flection in the ridge line shape and the ridge direction trend is a left-hand side ascending or a right-hand side ascending direction; and means for determining the pattern named plain arch as the second candidate for a ridge direction pattern with a ridge direction trend of nearly horizontal.

4. An apparatus for fingerprint pattern classification, comprising:

means for converting a fingerprint image picture to a set of digital data and storing said set of digital data in an image memory unit such that each digital data corresponding to a point in said fingerprint image picture is stored at an address of said image memory unit corresponding to position coordinates of said point in the fingerprint image picture;

means for subdividing said set of digital data stored in said image memory unit into plural zones, estimating an average ridge direction in each zone, and quantizing said averaged ridge direction in each zone to produce a ridge direction pattern of a fingerprint image picture;

means for determining a core zone which satisfies a predetermined condition in said ridge direction pattern;

means for determining ridge line shape around the core zone of said ridge direction pattern;

means for determining ridge direction trend around the core zone of said ridge direction pattern;

means for classifying a ridge direction pattern in accordance with said ridge line shape and said ridge direction trend of said ridge direction pattern; and means for rejecting classification of a ridge direction pattern which does not match to any one of predetermined types of classification;

wherein a position of a zone in said ridge direction pattern is defined in x-y rectangular coordinates in which y direction is determined to be perpendicular to a joint of a finger from which said fingerprint image picture is obtained, and x increases from left to right by a unit for a zone while y increases from top to bottom by a unit for a zone, said means for determining ridge line shape comprises means for detecting flection in y direction scanning for $(-x, +y)$ zones and for $(+x, +y)$ zones, said flection being defined as a change of ridge direction from a right-hand side ascending to a left-hand side ascending direction in $-x$ zones and as a change from a left-hand side ascending to a right-hand side ascending direction in $+x$ zones, said means for determining ridge direction trend comprises means for classifying ridge direction trend of zones in a predetermined window into a horizontal, a vertical, a right-hand side ascending, and a left-hand side ascending direction trend, and said means for classifying a ridge direction pattern comprises means for classifying a ridge direction pattern having the flection on both $-x$ and $+x$ zones to a pattern named whorl, a ridge direction pattern having the flection only in $-x$ zones with a left-hand side ascending ridge direction trend to a pattern named right loop, a ridge direction pattern having the flection only in $+x$ zones with a right-hand side ascending ridge direction trend to a pattern named left loop, a ridge direction pattern having no flection or having a vertical ridge direction trend to a pattern named tented arch, and a ridge direction pattern having a horizontal ridge direction trend to a pattern named plain arch.

5. An apparatus for fingerprint pattern classification according to claim 4, wherein said direction pattern has eight levels of quantized directions representing a direction from 0 to $7\pi/8$ by $\pi/8$, and labeled by 0, 1, 2, ... 7, said means for determining ridge line shape further comprises:

y direction scanning means for scanning zone labels from y=0 in an increasing y direction to a zone with label 0, and means for repeating said y direction scanning for all values of x and investigating whether there is a flection of ridge direction or not in a y direction, where said flection is defined as a change from a right-hand side ascending direction to a left-hand side ascending direction in $-x$ zones, and is defined as a change from a left-hand side ascending direction to a right-hand side ascending direction in $+x$ zones, said means for determining ridge direction trend further comprises:

means for determining $y_{max}$ in $+x$ direction scanning by value H where $H=[a(0)+0.05\{a(1)+a(7)\}+0.05\{a(2)+a(6)\}]/A$ in which $a(n)$ denotes a total number of zones having label n in a line of scanning and $A=a(0)+a(4)+0.5\{a(1)+a(3)+a(5)+a(7)\}+0.1\{a(2)+a(6)\}$ and $y_{max}$ is determined as a smallest even number of y where H becomes larger than a predetermined value, means for defining a first window by two y lines at x=2 and x=3 and by two x lines at y=0 and $y=y_{max}$, a second window by y lines at x=0 and x=1 and by x lines at y=0 and $y=y_{max}/2$, a third window by y lines at x=0 and x=1 and by x lines at $y=y_{max}/2$ and $y=y_{max}$, means for scanning all labels in said second and third windows and attributing a horizontal ridge direction trend when only labels 0, 1, and 7 are found, and attributing a nearly horizontal ridge direction trend when only labels 0, 1, 2, 6 and 7 are found in said second and third windows, and means for determining ridge direction trend by scanning all labels in said first window on a ridge direction pattern from calculated value of T where $T=[a(2)+0.5\{a(1)+a(3)\}+0.05\{a(0)+a(4)\}]/B$ in which $B=a(2)+a(6)+0.5\{a(1)+a(3)+a(5)+a(7)\}+0.1\{a(0)+a(4)\}$, and attributing a vertical, a right-hand side ascending, or a left-hand side descending ridge direction trend in accordance with the calculated value T, and said means for classifying a ridge direction pattern comprises:

means for classifying a ridge direction pattern with a ridge line shape having inflection in both sides of said core zone to a pattern named whorl, means for classifying a ridge direction pattern with a ridge line shape having inflection only in the left-hand side of said core zone and with a left-hand side ascending ridge direction trend to a pattern named right loop, means for classifying a ridge direction pattern with a ridge line shape having inflection only in the right-hand side of said core zone and with a right-hand side ascending ridge direction trend to a pattern named left loop, means for classifying a ridge direction pattern without flection or a ridge direction pattern with a vertical ridge direction trend to a pattern named tented arch, and means for classifying a ridge direction pattern with a horizontal ridge direction trend to a pattern named plain arch.

6. An apparatus for fingerprint pattern classification according to claim 5, further comprising means for determining a second candidate of classification comprising:

means for determining the pattern named tented arch as the second candidate when flection is detected in a vicinity of x=0 line in a right loop or in a left loop, means for determining the pattern named right loop or left loop as the second candidate when flection is detected in −x zones or in +x zones in a tented arch, means for determining the pattern named right loop or left loop as the second candidate when there is no flection in the ridge line shape and the ridge direction trend is a left-hand side ascending or a right-hand side ascending direction, and means for determining the pattern named plain arch as the second candidate for a ridge direction pattern with a ridge direction trend of nearly horizontal.

7. An apparatus for fingerprint pattern classification comprising:

means for converting a fingerprint image picture to a set of digital data and storing said set of digital data in an image memory unit, storing each digital data corresponding to a point in said fingerprint image picture at an address of said image memory unit corresponding to position coordinates of said point in the fingerprint image picture, means for subdividing said set of digital data stored in said image memory unit into plural zones, estimating an average ridge direction in each zone, and quantizing said average ridge direction in each zone to produce a ridge direction pattern of a fingerprint image picture, means for determining a core zone which satisfies a predetermined condition in said ridge direction pattern, means for representing a position of a zone in said ridge direction pattern by x-y rectangular coordinates in which x increases from left to right by a unit for a zone and y increases from top to bottom by a unit for a zone with the position of the core zone as the origin of the coordinates, means for determining ridge line shape in said ridge direction pattern in which flection is detected in y direction scanning on (−x, +y) zones, and on (+x, +y) zones, said flection being a change of ridge direction from a right-hand side ascending to a left-hand side ascending direction in −x zones and a change from left-hand side ascending to a right-hand side ascending direction in +x zones, means for determining ridge direction trend from said ridge direction pattern, in a first window defined by $x=-2$, $x=+3$, $y=0$, $y=y_{max}$, in a second window defined by $x=0$, $x=1$, $y=0$, $y=y_{max}/2$, and in a third window defined by $x=0$, $x=1$, $y=y_{max}/2$, $y=y_{max}$, wherein a horizontal ridge direction trend or a nearly horizontal ridge direction trend is detected in said second and third windows, and in case when horizontal ridge direction trend is not detected in said third window, a vertical, a left-hand side ascending, or a right-hand side ascending ridge direction trend is determined in said first window, means for classifying a fingerprint pattern in accordance with said ridge line shape and said ridge direction trend of said ridge direction pattern, wherein a ridge direction pattern having the flection on both −x and +x zones is classified to a pattern named whorl, a ridge direction pattern having the flection only in −x zones with a left-hand side ascending ridge direction trend is classified to a pattern named right loop, a ridge direction pattern having the flection only in +x zones with a left-hand side ascending ridge direction trend is classified to a pattern named right loop, a ridge direction pattern having no flection or having a vertical ridge direction trend is classified to a pattern named tented arch, and a ridge direction pattern having a horizontal ridge direction trend is classified to a pattern called plain arch, and means for rejecting classification of a fingerprint pattern which does not match to any one of predetermined types of classification.

* * * * *

UNITED STATES PATENT AND TRADEMARK OFFICE
CERTIFICATE OF CORRECTION

PATENT NO. : 5,337,369

DATED : August 9, 1994

INVENTOR(S) : Shibuya

It is certified that error appears in the above-indentified patent and that said Letters Patent is hereby corrected as shown below:

Col. 4, line 46, delete "2" insert -- -2 --.

Col. 5, line 44, delete "$G_{32}$" insert --$G_{35}$--.

Signed and Sealed this

Twenty-seventh Day of December, 1994

Attest:

BRUCE LEHMAN

*Attesting Officer*    *Commissioner of Patents and Trademarks*